N. T. COLEY.
COFFEE ROASTER.
APPLICATION FILED JUNE 12, 1908.
928,500.
Patented July 20, 1909.
3 SHEETS—SHEET 1.
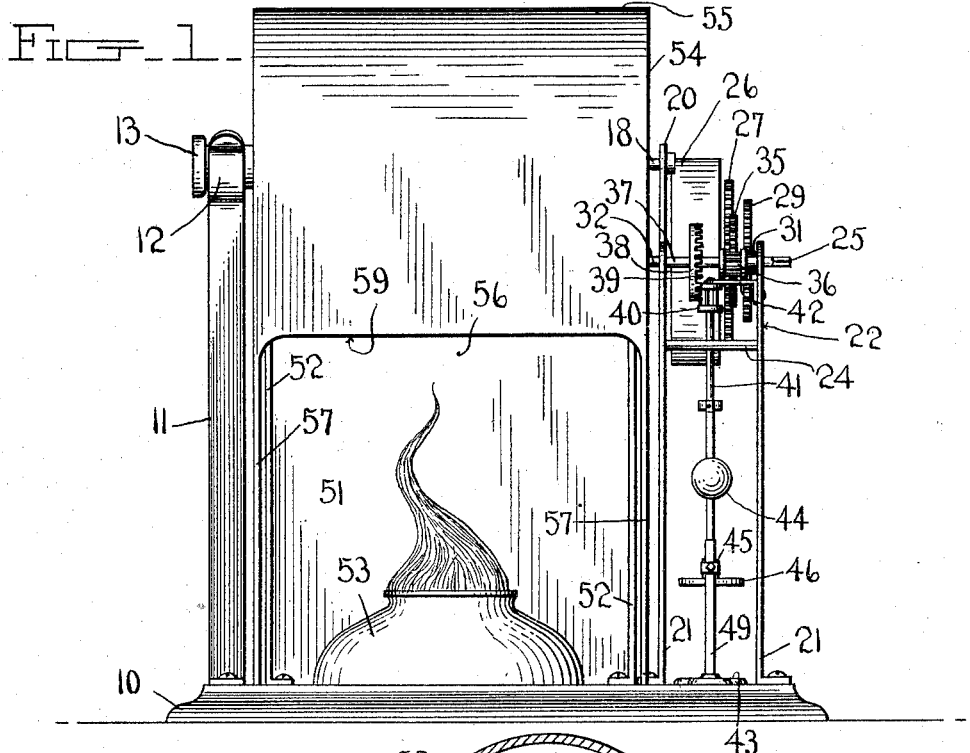
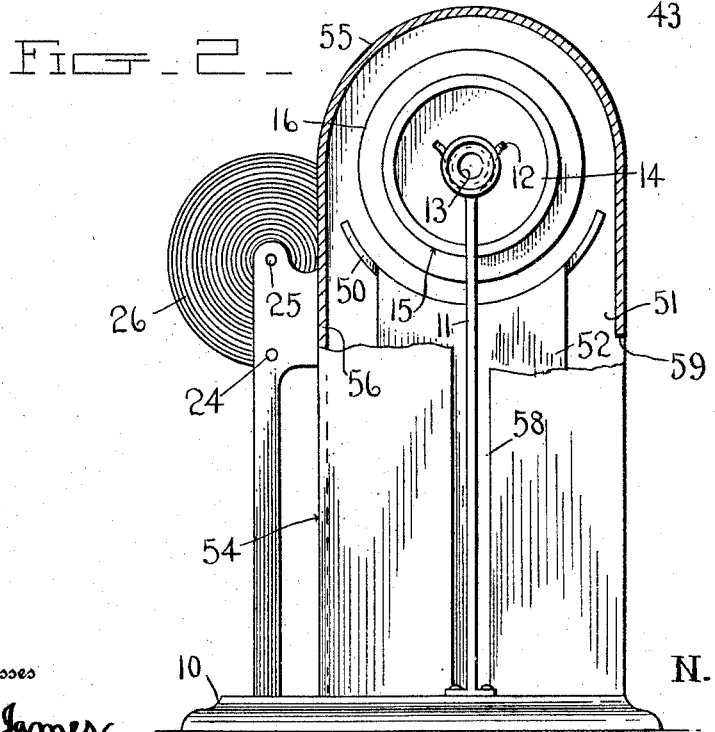
Witnesses
L. B. James
M. J. Miller
Inventor
N. T. Coley
By Chandlee & Chandlee
Attorneys

N. T. COLEY.
COFFEE ROASTER.
APPLICATION FILED JUNE 12, 1908.

928,500.

Patented July 20, 1909.
3 SHEETS—SHEET 2.

Witnesses
L. B. James
M. T. Miller

Inventor
N. T. Coley
By Chandlee & Chandlee
Attorneys

N. T. COLEY.
COFFEE ROASTER.
APPLICATION FILED JUNE 12, 1908.

928,500.

Patented July 20, 1909.
3 SHEETS—SHEET 3.

Witnesses
L. B. James
M. J. Miller

Inventor
N. T. Coley
By Chandlee & Chandlee
Attorneys

UNITED STATES PATENT OFFICE.

NOAH T. COLEY, OF WILSON, NORTH CAROLINA.

COFFEE-ROASTER.

No. 928,500.      Specification of Letters Patent.      Patented July 20, 1909.

Application filed June 12, 1908. Serial No. 438,216.

*To all whom it may concern:*

Be it known that I, NOAH T. COLEY, a citizen of the United States, residing at Wilson, in the county of Wilson, State of North Carolina, have invented certain new and useful Improvements in Coffee-Roasters; and I do hereby declare the following to be a full, clear, and exact description of the invention, such as will enable others skilled in the art to which it appertains to make and use the same.

The invention relates to roasting machines and more particularly to the class of coffee roasters.

The primary object of the invention is the provision of a roaster having a rotatable cylinder for receiving coffee and the like to be roasted, driving mechanism for rotating the cylinder and having a governor, a heating compartment or chamber and a casing inclosing the rotatable cylinder and a portion of the heating compartment, the said casing being removable.

Another object of the invention is the provision of a roaster for coffee and the like which is simple in construction, efficient in operation and inexpensive in the manufacture.

With these and other objects in view the invention consists in the construction, combination and arrangement of parts as will be hereinafter more fully described and as illustrated in the accompanying drawings which disclose the preferred form of embodiment of the invention. However, changes, variations and modifications may be made such as come properly within the scope of the claims hereunto appended, without departing from the spirit of the invention.

Figure 3:
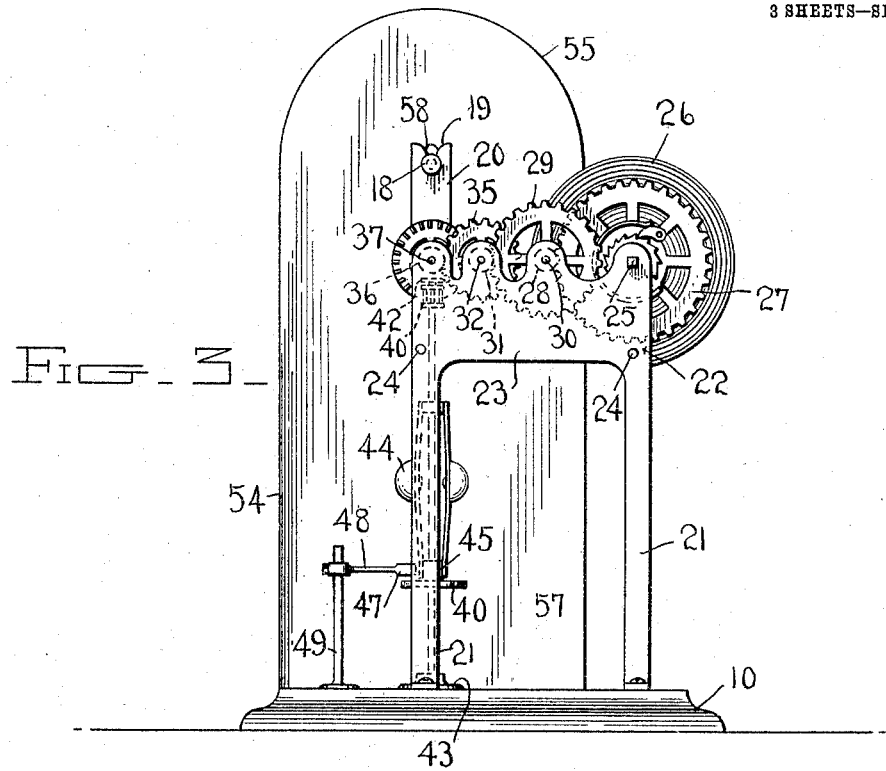
Figure 5:
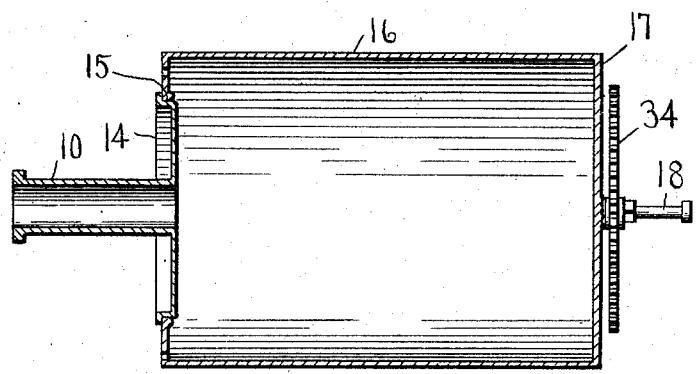
Figure 4:
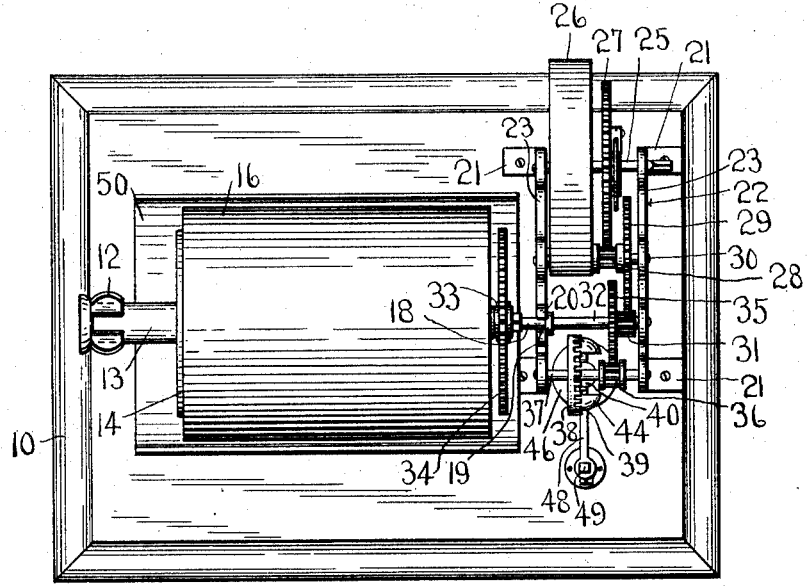
Figure 6:
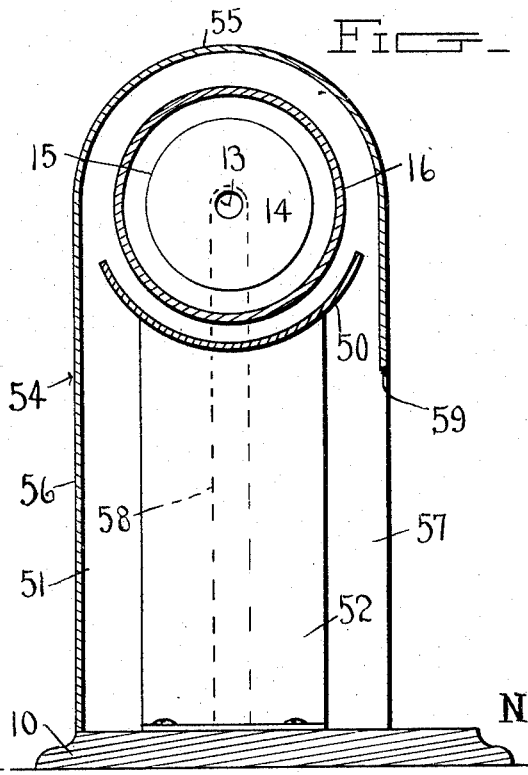

In the drawings:—Figure 1 is a front view of the invention. Fig. 2 is a view of one end of the same, with the casing partly broken away. Fig. 3 is a view of the other end. Fig. 4 is a top plan view of the roaster with the casing removed. Fig. 5 is a longitudinal sectional view of the drum or cylinder detached. Fig. 6 is a transverse vertical sectional view through the removable casing and drum.

Similar reference characters indicate corresponding parts throughout the several views in the drawings.

In the drawings, the numeral 10 designates a base or bed plate of the machine having an upright or standard 11 terminating at its upper end in oppositely disposed yieldable bearing ears 12 for detachably receiving a hollow journal 13 secured centrally of a removable end cover 14 which frictionally engages a cylindrical mouth opening 15 at one end of a drum or cylinder 16 which latter is adapted to receive coffee and the like to be roasted. The opposite closed end 17 of the cylinder has a centrally projecting journal 18 detachably mounted in a bearing recess 19 of a short standard 20 secured to the motor or clock frame hereinafter described.

Mounted upon the base or bed plate 10 near the opposite end thereof are vertical standards 21 supporting a motor frame 22 arranged at one side of the drum and which frame includes spaced side plates 23 arranged in parallel relation to each other and united by transversely disposed connecting end rods 24. Journaled in the side plates 23 is a winding shaft 25 of a main spring 26 controlling a driving gear 27 in mesh with a pinion 28 having a gear wheel 29 fixed to a shaft 30 journaled in the motor frame and which gear wheel 29 enmeshes with a pinion 31 fixed to a driving shaft 32 journaled in the motor frame and projecting through and beyond the standard 20 and having mounted thereon at its free end a pinion 33 which latter meshes with a cog wheel 34 fixed to the journal 18 of the drum or cylinder whereby the latter is adapted to be rotated through the medium of the gearing by the main spring controlling the drive gear. Upon the drive shaft 30 is a gear wheel 35 enmesh with a pinion 36 on a shaft 37 journaled in the motor frame and which latter shaft has fixed thereto a wheel 38 provided with peripheral side teeth 39 enmesh with a pinion 40 fixed to a vertically disposed governor shaft 41 having its upper end engaging a bearing bracket 42 secured to the motor frame and the opposite end of said governor shaft having its bearing in a bearing block 43 secured to the base plate 10 of the machine. The governor shaft 41 carries a weighted ball governor 44 controlling a slidable sleeve 45 on the governor shaft and having a disk 46 engaging a brake-shoe 47 carried by a yieldable arm 48 mounted upon a vertical standard 49 on the base plate of the machine.

Immediately below the rotatable drum or cylinder 16 is a semi-circular plate 50 forming the top of a lamp space 51 and which plate is mounted upon vertical end walls 52 secured to the base or bed plate. Upon the said base or bed plate 10 between the end walls 52 is positioned a burner 53 which may be of any suitable construction.

To inclose the drum of cylinder 16 there is provided a removable casing 54 having a curved top wall 55 extended downwardly to form a rear closing wall 56 united to end walls 57 the latter having central vertically disposed open slots 58 for receiving the journals of the drum or cylinder when the casing is brought to a position to inclose the said drum. The lower front portion of the casing is open as at 59 to permit the introduction and withdrawal of the burner. It is obvious that due to the formation of the removable casing 54 by having a curved top wall 55 permits the heat from the burner to pass around the rotatable cylinder or drum 16 and out through the open front 59 of said casing. The semi-circular plate 50 directs the heat from the burner to the top of the casing. The hollow journal 13 forms an exhaust port or outlet in communication with the rotary cylinder or drum to permit excessive heat to escape therefrom.

What is claimed is—

1. A roaster of the class described comprising a base, a standard mounted at one end of said base and terminating in yieldable bearing ears, a motor frame mounted at the other end of the base, a standard formed on said motor frame and having a bearing recess, a rotatable drum having journals at opposite ends thereof mounted in the bearing ears and recess respectively, motor mechanism supported by said motor frame and adapted to rotate said drum, a semi-circular plate having spaced vertical side walls arranged immediately below the drum to form a lamp space, a removable lamp supported upon the base within said lamp space, and a casing inclosing said drum and adapted to form a space between the latter and said casing.

2. A roaster of the class described comprising a base, standards rising from said base, one of said standards having yieldable bearing ears and the other containing a bearing recess, a rotatable drum having journals engaging the recess and yieldable bearing ears, one of said journals containing an exhaust passage leading from the interior of the drum to the atmosphere, and spring actuated motor mechanism having connection with the drum to rotate the same.

3. In a roasting machine, a base, standards rising from said base, yieldable bearing ears formed on one of said standards, the other standard being provided with a bearing recess, a rotatable drum having journals engaging the bearing ears and recess of the standards, one of said journals being provided with an exhaust port, motor mechanism supported by said base and having gear connection with the drum to rotate the same, and a removable casing for entirely inclosing the drum.

4. In a roasting machine, a base, a standard mounted at one end of the said base and terminating in yieldable bearing ears, a motor frame mounted upon the other end of the base, a standard secured to said motor frame and having a bearing recess, a rotatable drum having an open end, a detachable cover for closing the open end of the drum, a journal projecting from the closed end of the drum and detachably mounted in the bearing recess in the standard on the motor frame, a hollow journal fixed to the detachable cover and detachably engaging the yieldable bearing ears of the other standard, said hollow journal forming an exhaust port for the drum, a burner arranged below the said drum, a removable casing for entirely inclosing the drum and spring motor mechanism for rotating the drum.

In testimony whereof, I affix my signature, in presence of two witnesses.

NOAH T. COLEY.

Witnesses:
W. R. WOOD,
L. C. BAREFOOT.